Patented Jan. 11, 1927.

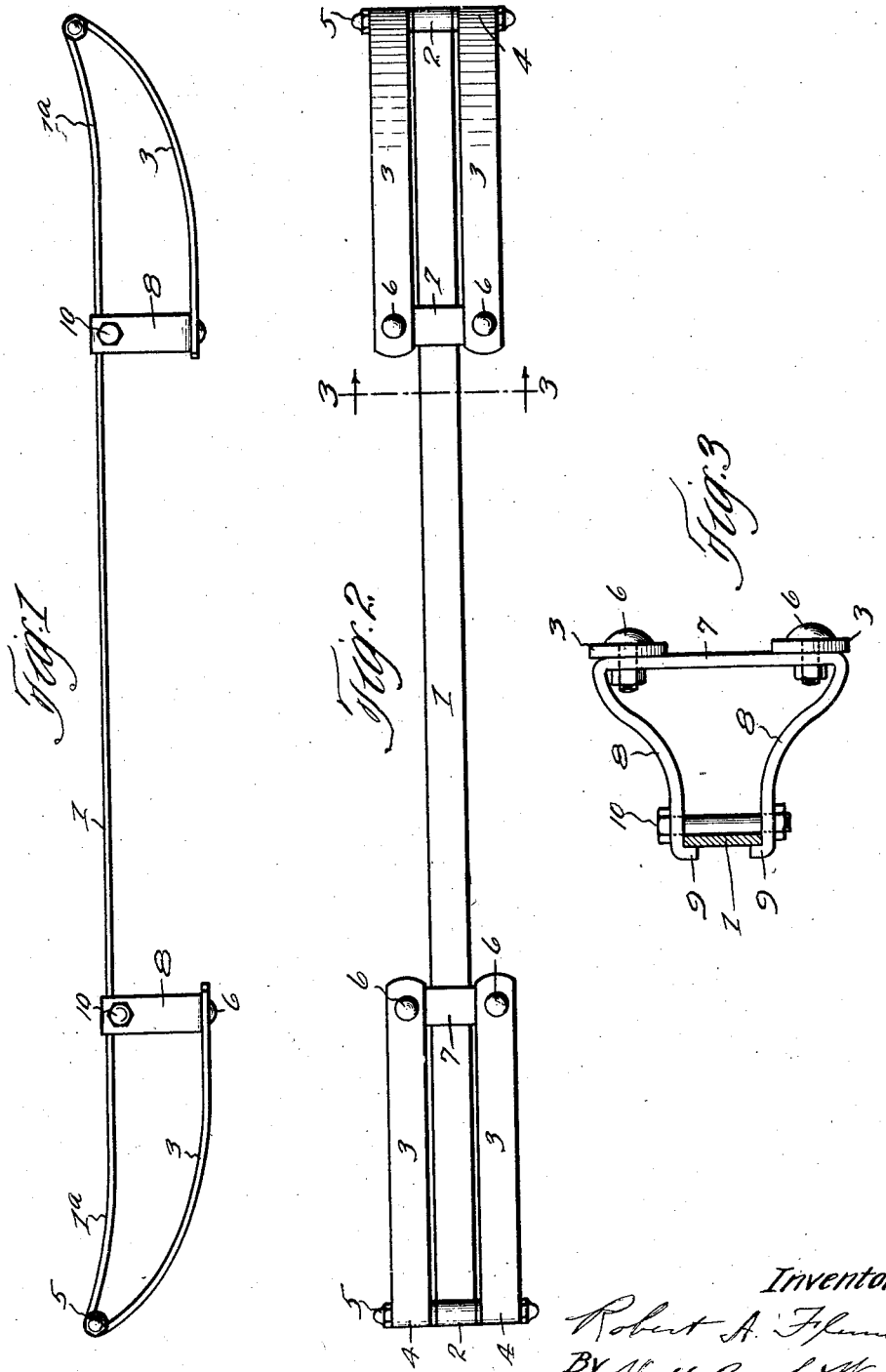

1,613,699

UNITED STATES PATENT OFFICE.

ROBERT A. FLUM, OF KALAMAZOO, MICHIGAN, ASSIGNOR TO THE C. G. SPRING & BUMPER COMPANY, OF DETROIT, MICHIGAN, A CORPORATION OF DELAWARE.

BUMPER.

Application filed April 10, 1924. Serial No. 705,538.

This invention relates to bumpers, and more particularly to combined bumpers and fender guards, adapted to be applied to the rear ends of automobiles and similar vehicles.

The invention disclosed herein is embodied in a bumper and fender-guard wherein a space or pocket is provided, between the body of the bumper and the fender guard portions thereof, for the reception of a spare tire, an instance of a bumper of this type being shown in Patent No. 1,476,605 issued December 4, 1923, to Christian Girl and Wayne E. Dunston.

It is the general purpose and object of the invention to provide a combined bumper and fender guard of the foregoing type which shall be simple in construction and inexpensive of production, and one wherein the inner ends of the rear bars of the fender-guard portions of the bumper are connected to the main bar in a particularly efficient manner and are so formed and combined with such connecting means as not only to enable the parts to be constructed cheaply, but to render the bumper capable of protecting efficiently the fenders with which they cooperate.

I accomplish the foregoing objects in and through the construction shown in the drawings, wherein Fig. 1 represents a plan of a combined bumper and fender guard constructed in accordance with my invention; Fig. 2 an elevation of the same; and Fig. 3 a detail in section corresponding to the line 3—3 of Fig. 2.

Describing the various parts by the reference characters, 1 denotes what will be the front bar of the bumper when applied to the rear of a vehicle, the said bar having its ends 1ª curved slightly forwardly and being of such length as to extend across the rear end and the fenders of the vehicle. Each end of the bar has an eye 2. Cooperating with each end of the bar 1, is an upper and a lower bar, indicated at 3, each bar having an eye 4 at its outer end, these eyes being arranged above and below the eyes 2 and connected thereto by means of bolts 5. From each bolt, each bar 3 extends inwardly and rearwardly, having its inner end substantially parallel with the part of the bar 1 which is opposite thereto. The inner end of each bar 3 is merely rounded off and is connected by a bolt 6 with the vertical body 7 of a spacing clamp, the said clamp comprising, in addition to the body 7, upper and lower spacing and clamping arms 8 each having a flange 9 at its front end, which flanges 9 are adapted to engage the top and bottom edges of the bar 1, being secured thereto by a bolt 10. It will be noted that the bolt 10 extends through openings in the arms 8 which are so arranged as to cause the bolt to bear against the rear face of the bar 1 when the front face thereof is engaged by the flanges 9.

The construction described herein is simple and economical of production and is capable of being plated in a simple and inexpensive manner.

By varying the length of the spacing and clamping arms 8, the depth of the pocket provided between the inner ends of the bars 3 and the part of the bar 1 in front of and between such ends can be varied to accommodate one or more tires, in accordance with the requirements of the particular installation.

Having thus described my invention, what I claim is:—

1. A combined bumper and fender guard comprising a bar adapted to extend across the rear end of a vehicle, a bar secured to each end of the first-mentioned bar above and below the same, respectively, the last-mentioned bars extending inwardly and rearwardly from the ends of the first-mentioned bar, and means connecting the inner ends of the second-mentioned bars to the first-mentioned bar, the said means comprising a pair of combined spacing and clamping arms at each side of the bumper, each arm being connected at one end to the inner end of each of the second-mentioned bars and each arm having a flange at its front end adapted to engage the first-mentioned bar and a bolt connecting the upper and lower arms of each pair of arms and securing the same to the first-mentioned bar.

2. A combined bumper and fender guard comprising a bar adapted to extend across the rear end of a vehicle, a bar secured to each end of the first-mentioned bar above and below the same, respectively, the last-mentioned bars extending inwardly and rearwardly from the ends of the first-mentioned bar, and means connecting the inner ends of the second-mentioned bars to the first-mentioned bar, the said means comprising a pair of combined spacing and clamping arms at each side of the bumper, each arm being connected at one end to the inner end of each of the second-mentioned bars, and means connecting the upper and lower arms of each pair and securing the same to the first-mentioned bar.

3. A fender guard comprising a bar adapted to extend across a fender, bars secured to the outer end of the first-mentioned bar and extending rearwardly and inwardly therefrom and arranged above and below the first-mentioned bar, respectively, and means securing the inner ends of the last two bars to the first-mentioned bars, the said means comprising a body secured to the inner ends of the second-mentioned bars, combined clamping and spacing arms projecting forwardly from the upper and lower ends of said body, respectively, and means for securing the front ends of the said arms to the first-mentioned bar.

4. A fender guard comprising a bar adapted to extend across a fender, bars secured to the outer end of the first-mentioned bar and extending rearwardly and inwardly therefrom and arranged respectively above and below the first-mentioned bar, respectively, and means securing the inner ends of the last two bars to the first-mentioned bars, said means comprising a spacing and clamping arm secured to the inner end of the upper bar, a spacing and clamping arm secured to the inner end of the lower bar, the front portions of the said arms being deflected toward each other thereby to engage the top and bottom edge respectively of the first-mentioned bar and each having at its front end a flange adapted to engage the front face of said bar, and a bolt connecting the said arms adjacent to the rear face of the first-mentioned bar.

5. A fender guard comprising a bar adapted to extend across a fender, bars secured to the outer end of the first-mentioned bar and extending rearwardly and inwardly therefrom and arranged above and below the first-mentioned bar, respectively, and means securing the inner ends of the last two bars to the first-mentioned bar, said means comprising a spacing and clamping arm secured to the inner end of the upper bar, a spacing and clamping arm secured to the inner end of the lower bar, the front portions of the said arms being deflected toward each other thereby to engage the top and bottom edge respectively of the first-mentioned bar and each having at its front end a flange adapted to engage the front face of said bar, and a bolt connecting the said arms.

In testimony whereof, I hereunto affix my signature.

ROBERT A. FLUM.